(No Model.) 2 Sheets—Sheet 1.
L. T. WEISS.
CASH INDICATOR AND REGISTER.
No. 428,259. Patented May 20, 1890.
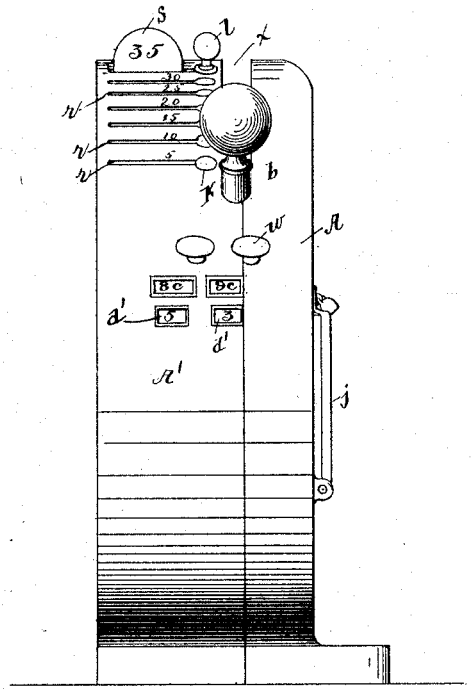
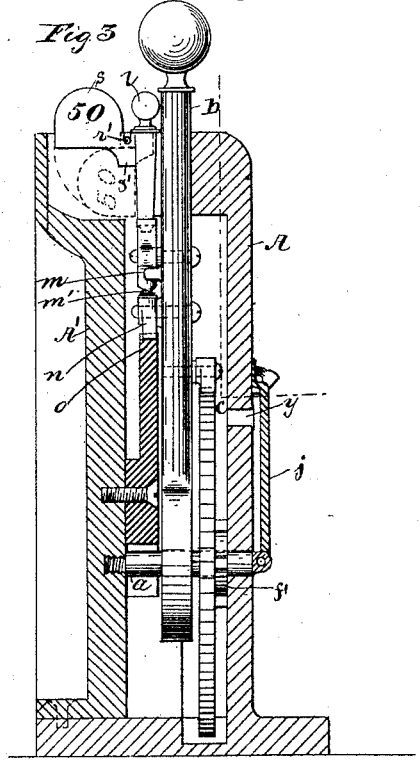
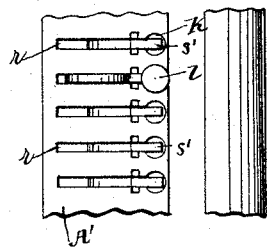
WITNESSES:
INVENTOR:
By
Attorney.

(No Model.) 2 Sheets—Sheet 2.
L. T. WEISS.
CASH INDICATOR AND REGISTER.
No. 428,259. Patented May 20, 1890.
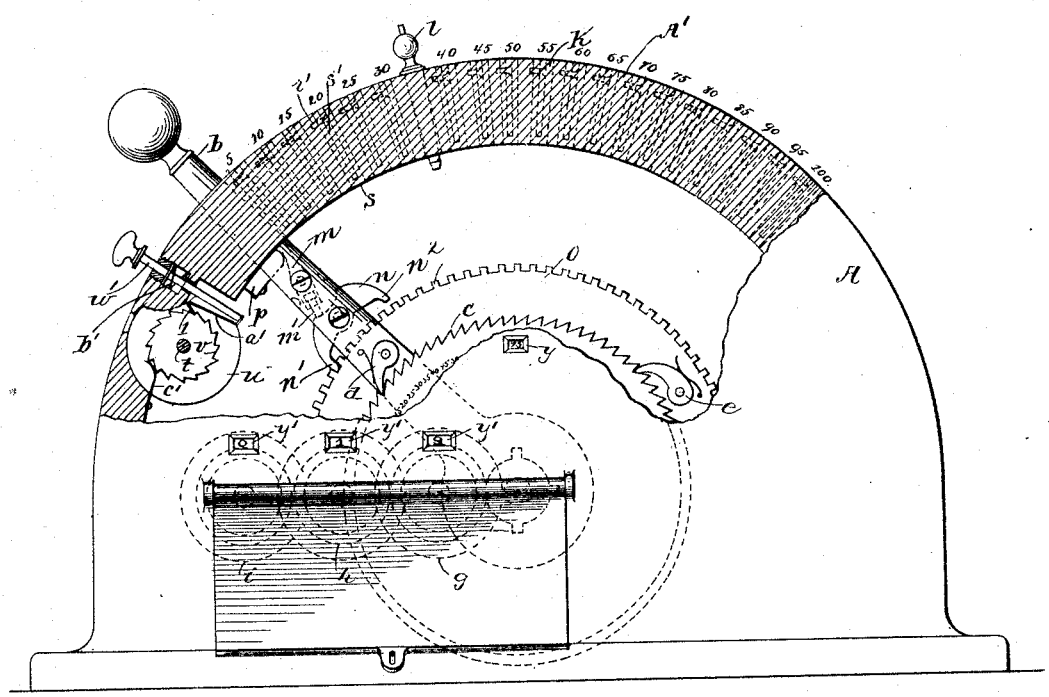
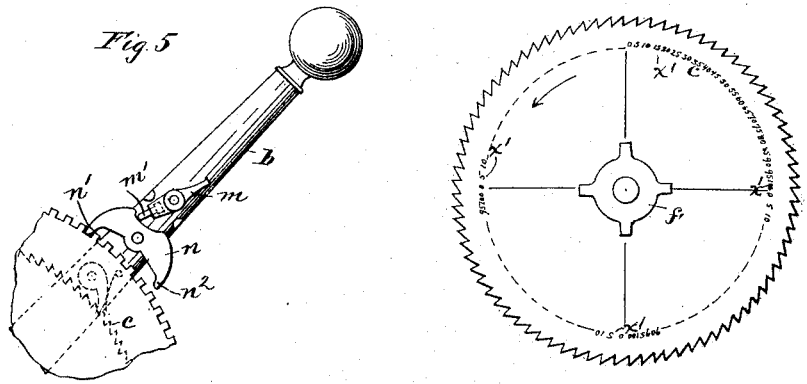
WITNESSES:
INVENTOR:
By _____ Attorney.

UNITED STATES PATENT OFFICE.

LOUIS T. WEISS, OF BROOKLYN, ASSIGNOR TO THOMAS MURTHA AND FRANK BURNS, OF NEW YORK, N. Y.

CASH INDICATOR AND REGISTER.

SPECIFICATION forming part of Letters Patent No. 428,259, dated May 20, 1890.

Application filed November 29, 1889. Serial No. 332,046. (No model.)

*To all whom it may concern:*

Be it known that I, LOUIS T. WEISS, a citizen of the United States, and a resident of Brooklyn, in the county of Kings and State of New York, have invented certain Improvements in Cash-Counters, of which the following is a specification.

My invention relates to that class of devices employed for counting, checking, and adding up the cash received by a salesman or attendant in a store or saloon, and especially the latter, the object being to provide a check on the bar-tender and means whereby the proprietor may ascertain at the end of the day just how much money there should be in the till. Such devices have heretofore been quite elaborate and costly; and the object of my invention is, in the main, to produce a satisfactory apparatus specially adapted for the use of saloons, and which may be produced at a moderate cost.

My invention will be fully described hereinafter, and its novel features carefully defined in the claims.

In the accompanying drawings, illustrative of my invention, Figure 1 is a front elevation of a cash-counter embodying my improvements. Fig. 2 is a sectional side elevation of the same, the plane of the section being substantially indicated by line 2 2 in Fig. 1. Fig. 3 is a vertical transverse section of the same, the internal mechanism being seen in elevation. Fig. 4 is a fragmentary plan view of the casing of the apparatus, and Figs. 5 and 6 are detail views of parts of the mechanism that will be hereinafter described.

Before proceeding to describe the construction and operation of my apparatus I will say that it is adapted for adding up fives or multiples of five. Ordinarily the sums received by a bar-tender are of this character, as five, ten, fifteen, &c., and a machine may be constructed to indicate and add up these numbers much more simply and cheaply than one adapted to add up the intermediate numbers, as six, seven, eight, &c., also. Indicators are provided whereby the customer and any bystander may see the amount of the payment displayed in plain numerals, and means are provided whereby the bar-tender is compelled to add on the register the exact amount received from the customer, and indicated, to the sum of the previous receipts.

In addition to the above mechanism the apparatus will be provided with a counter to register the number of sales of a special character. For example, there are certain sales of beverages by the pint and quart, for which the regular established charges will be eight cents and nine cents, respectively, and the sums received for these sales cannot be added by the ordinary adding mechanism I employ, as they are not multiples of five. To provide for these sales, I furnish the apparatus with counters by which the number of sales of this character may be registered, but not the sum received therefrom.

A is a suitable casing, which will, by preference, be of cast-iron, with an arched crown, as seen in Fig. 2. In this casing will be fixed a stud $a$, on which swings a radially-arranged lever or operating-arm $b$. This arm plays in a slot $x$ in the arched crown of the casing, and is limited in its play by the length of said slot. Preferably the slot will comprise a little more than a quarter of a circle drawn from the stud $a$ as a center, the arm $b$ playing through a quarter of said circle. This quadrant will be equally divided into twenty parts, and the divisions will be numbered (see Fig. 2) along the margin of the slot $x$ 5, 10, 15 - - - 95, 100, each division representing five cents and the twenty divisions representing one dollar.

Mounted to rotate on the stud $a$ beside the arm $b$ is a ratchet-wheel $c$, having eighty teeth, and carried by the arm $b$ is a spring-pawl $d$, which engages the teeth on the wheel $c$. The wheel $c$ is stopped against back rotation by a spring-pawl $e$, fixed to some part of the casing A. Thus every vibration of the arm $b$ to the full extent permitted by the slot $x$ will turn the ratchet-wheel $c$ one-quarter of the way round.

Marked on the side of the ratchet-wheel $c$ in a circle (see Fig. 6, which shows wheel $c$ detached) is a series $x'$ of numerals 5, 10, 15 - - - 95, 0, each quadrant comprising twenty divisions so numbered and corresponding to the number of teeth in the wheel, and as the wheel is rotated these numerals are brought in succession before a sight-aperture $y$ in the casing A, as seen in Fig. 2.

The ratchet-wheel $c$ carries a four-toothed wheel $f$, (see Fig. 6,) which at each quarter of a rotation of the wheel $c$ imparts one-tenth of a full rotation to a disk $g$ in a well-known way. The disk $g$ is the "dollar-disk," and it bears on its face the ten digits. One complete rotation of the dollar-disk $g$ imparts one-tenth of a rotation to a "ten-dollar disk" $h$, which also bears on its face the ten digits. One complete rotation of the ten-dollar disk $h$ imparts one-tenth of a rotation to a "hundred-dollar disk" $i$, which bears on its face also the ten digits. The numerals on the respective faces of the disks $g$, $h$, and $i$ will appear in succession at the respective sight-apertures $y'$ in the casing A, and these apertures may be covered by a hinged flap or door $j$, so that the numerals appearing thereat can be concealed from view.

The use of units, tens, and hundreds disks numbered and operated in this way is too common to require any special description here, and there are many known devices whereby one disk is made to impart intermittent rotary motion to another. Any one of these known devices may be employed in my apparatus. For example, the disks $g$, $h$, and $i$ may each be provided with ten equally-spaced short studs or pins projecting from its face and arranged in a circle, and the driving-disks may each be provided with a single long tooth adapted to engage said pins on the adjacent driven disk. The disks may also be provided with frictional devices or spring-pawls to prevent accidental rotation on their axes. This is a common device and one well known in the art.

The device as above described would enable the operator to add up any sum (if it be composed of fives or multiples thereof) that may be received by him, the only requirement being the swinging or pushing of the arm $b$ from the normal position at zero, as seen in Fig. 2, over to the proper numbered division marked on the crown of the casing, and then pulling said arm back again to its normal position. For example, if the bar-tender receives twenty-five cents and he first pushes the arm $b$ over to the numeral 25, and then draws it back again to its normal position, he will add twenty-five to the sum, as in pushing over the arm $b$ to the numeral 25 the pawl $d$ plays over five teeth in the ratchet-wheel $c$, and the drawing back of the arm to zero will rotate said ratchet-wheel to the proper extent to add twenty-five to the sum; but it is necessary in this class of machines to provide a check on the bar-tender, in order that he shall be compelled to add up the whole of the amount received. This device I will now describe. At each of the numbered divisions of the crown of the casing A along the slot $x$ is bored a hole $k$, extending radially through the said crown, and a stop-pin $l$ is provided, which the operator must insert in one of said holes. This pin $l$ projects into the hollow of the casing, and its tip is in the path of a shifter $m$, pivotally mounted on the side of the arm $b$. This shifter has in its lower end a spring-plunger $m'$, which bears on the crown of a rocking dog $n$, also pivotally mounted on the side of the arm $b$. This dog has two teeth $n'$ $n^2$ at its respective ends, either of which may be made to engage the teeth on a fixed curved rack $o$. When the shifter $m$ is thrown over to the position seen in Fig. 2, the tooth $n'$ will be pressed down thereby elastically into engagement with the teeth of the fixed rack $o$. The arm $b$ may under these conditions be pushed over, (to the right in Fig. 2,) but it cannot be drawn back, by reason of the engagement of said tooth with the rack, until the upper extremity of the shifter $m$ strikes the pin $l$, and is thereby pushed over until the spring-plunger $m'$ thereof is moved over to the upper end of the dog $n$. This will have the effect to release the tooth $n'$ of the dog and to put the tooth $n^2$ thereof into engagement with the teeth of the rack $o$. The arm $b$ may now be drawn back to its normal position, where a shoulder or lug $p$ on the casing A impinges on the upper extremity of the shifter $m$, and shifts the latter again to its first position, as represented in Fig. 2. Thus the operator is compelled to push over the arm $b$ to the full extent of its movement, as limited by the pin $l$, and to draw it back again to zero, which is its normal position. The pin $l$ must be inserted in the hole $k$ by the bar-tender at the numeral corresponding to the sum he has received from the customer. For example, if he has received thirty-five cents, he inserts the pin in the hole at the numeral 35. Then a movement of the arm $b$ up to the pin $l$ and back again will add thirty-five cents to the sum. In order, however, that the customer may see that the pin $l$ is inserted at the proper hole $k$, I provide the apparatus with an indicator, whereby the insertion of the pin $l$ in a hole $k$ will throw up or disclose a tablet on which is marked in plain numerals the number corresponding to that hole. This indicating device will now be described. Radial slits $r$ are formed (see Figs. 3 and 4) in a part A′ of the casing A, said slits extending each into one of the holes $k$. In each of these slits is pivotally mounted at $r'$ an indicator-tablet $s$, of sheet metal or other suitable material, on which is marked plainly the number of the hole and division to which said tablet belongs. In Fig. 3 the tablet is represented by dotted lines in the position it will assume normally by force of gravity, the broader portion bearing the numeral being suspended within the slot $r$ out of sight. When in this position, the heel $s'$ of the tablet will project into the hole $k$, and when the bar-tender inserts the pin $l$ in the hole the inserted end of the pin will strike on and depress said heel, thus throwing up the tablet $s$ into the position seen in full lines in Fig. 3.

The tablet will necessarily remain elevated and in plain view until the pin $l$ is removed, when it will again drop down out of sight. The curved rack $o$, which may be secured in any convenient manner to the casing A, will have its teeth spaced and proportioned to the teeth of the ratchet-wheel $c$ and the divisions on the crown of the casing in such a manner that when the shifter $m$ strikes the pin $l$ or lug $p$ the respective teeth on the rocking dog $n$ will descend properly into the spaces between the teeth on the rack.

I will now describe the counting device for eight and nine cent sales, premising, however, that these devices are precisely alike and independently operated, and that there may be one or more of them placed within the casing and at any point. As herein shown, these devices are designed merely to register the number of nine-cent and eight-cent sales; but they may register as well six-cent or four-cent or seven-cent sales. I will describe only one of these devices, as they are precisely alike. On a suitable stud $t$ in the casing A is rotatively mounted a wheel $u$, on the edge of which are stamped a series of numerals in arithmetical succession, 1, 2, 3, 4, &c. These numerals will be equally spaced, and there may be as many of them as their size and the circumference of the wheel will allow. On the side of the wheel $u$ is fixed a ratchet-wheel $v$, having as many teeth as there are numerals on the edge of the wheel. The wheel $u$ is rotated intermittently by means of a push-button $w$ on the end of a stem $w'$, which plays in an aperture in the casing A and carries on its inner end a spring-pawl $a'$, which engages with the teeth on the ratchet-wheel $v$. A spring $b'$ retracts the stem $w'$, which has only play sufficient to allow the pawl to engage one tooth at a time. A pawl $c'$ prevents back rotation of the ratchet-wheel $v$ and wheel $u$. The numerals on the edge of the wheel $u$ are brought in succession to a sight-aperture $d'$ in the casing. Just above the aperture $d'$ (see Fig. 1) is marked the number 8, or some number or legend to designate what it is that should be counted or registered by the wheel $u$ when sold. The series of twenty numbered divisions on the arched crown of the casing or frame A may include some lesser portion than a quadrant or fourth of the whole circle of which said arched crown forms a part, as the proportion is not absolutely essential. It is important that the angle the terminal radial slots $r$ make with the perpendicular shall not be so great as to prevent the tablets $s$ from falling back into said slots when the stop-pin $l$ is withdrawn. If this should be the case, retracting-springs may be employed to draw said tablets into the slots.

Having thus described my invention, I claim—

1. In a cash-counter, the combination, with the casing provided with a slot $x$ in its crown, a series of holes $k$ along the margin of said slot, and a lug $p$, of the operating-arm $b$, mounted in said casing and adapted to be moved to and fro in said slot, the shifter $m$, pivotally mounted on said arm and having a spring-plunger bearing on the rocking dog $n$, the said dog mounted on the arm $b$ and having teeth adapted to engage the fixed rack $o$, the said rack $o$, the stop-pin $l$ for insertion in the holes $k$ to limit the forward movement of the arm $b$, said pin and the lug $p$ being in the path traversed by the shifter, the ratchet-wheel $c$, the pawl $e$, which prevents back rotation of said wheel, and the pawl $d$ on the arm $b$, engaging the teeth of said ratchet-wheel, all arranged to operate substantially as set forth.

2. In a cash-counter, the combination, with the casing A, having a series of holes $k$ in its crown and a series of slots $r$, connecting with said holes respectively, as described, of a series of tablets $s$, bearing numerals and pivoted in the respective slots $r$, said tablets having heels $s'$, which project normally into the holes $k$, and the stop-pin $l$, adapted to be inserted in said holes, whereby a numbered tablet is thrown up into view and held up by the insertion of said pin in any one of said holes.

In witness whereof I have hereunto signed my name in the presence of two subscribing witnesses.

LOUIS T. WEISS.

Witnesses:
HENRY CONNETT,
J. D. CAPLINGER.